United States Patent [19]

Generini

[11] 4,087,276
[45] May 2, 1978

[54] REMOVAL OF MERCURY FROM SLUDGE BY HEATING AND CONDENSING

[75] Inventor: Gianni Generini, Ravenna, Italy

[73] Assignee: ANIC S.p.A., Palermo, Italy

[21] Appl. No.: 816,188

[22] Filed: Jul. 15, 1977

Related U.S. Application Data

[63] Continuation of Ser. No. 683,093, May 4, 1976, abandoned.

[30] Foreign Application Priority Data

May 5, 1975 Italy .............................. 22997 A/75

[51] Int. Cl.$^2$ ............................................. C22B 43/00
[52] U.S. Cl. ......................................... 75/81; 203/87; 210/59; 210/71; 210/73 S; 55/46
[58] Field of Search ................... 55/46; 75/63, 81, 88; 159/2 E, 6 WH; 203/87, 91, 65, 59; 210/71, 72, 73 S, 56

[56] References Cited

U.S. PATENT DOCUMENTS

| 898,980 | 9/1908 | Lowenstein | 203/87 |
|---|---|---|---|
| 1,195,236 | 8/1916 | Landers | 75/81 |
| 1,315,663 | 9/1919 | Gould | 75/81 |
| 1,728,359 | 9/1929 | Ormont | 75/81 |
| 2,186,876 | 1/1940 | Menardi | 75/81 |
| 3,037,759 | 6/1962 | Smith | 75/81 |
| 3,596,893 | 8/1971 | Foliforov | 75/81 |
| 3,662,998 | 5/1972 | Stratton | 75/81 |
| 3,704,875 | 12/1972 | Waltrich | 75/81 |
| 3,767,381 | 10/1973 | Bielefeldt | 203/87 |

FOREIGN PATENT DOCUMENTS

| 108,664 | 4/1939 | Australia | 75/88 |
|---|---|---|---|
| 202,939 | 7/1954 | Australia | 75/88 |
| 1,121,845 | 10/1965 | United Kingdom | 75/81 |

OTHER PUBLICATIONS

Chemical Eng. Progress (vol. 70, No. 3) Mar. 1974, Mercury Recovery from Process Sludges pp. 73-79.

*Primary Examiner*—Charles N. Hart
*Assistant Examiner*—Ernest G. Therkorn
*Attorney, Agent, or Firm*—Morgan, Finnegan, Pine, Foley & Lee

[57] ABSTRACT

A method is disclosed for stripping mercury from mercury-containing sludges, the improvement consisting in that the sludges are first dried and then roasted, all these operations being carried out under a subatmospherical pressure, a final condensation of the vapor phases takes place under superatmospherical pressure. A high efficiency of recovery is thus warranted.

11 Claims, 2 Drawing Figures

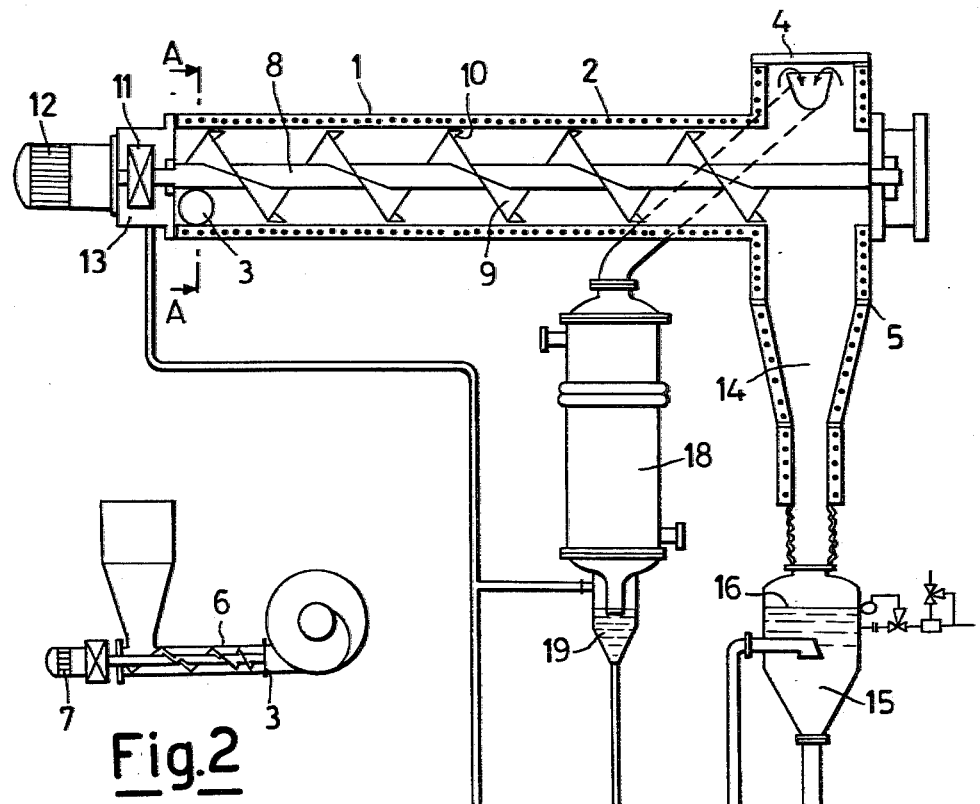
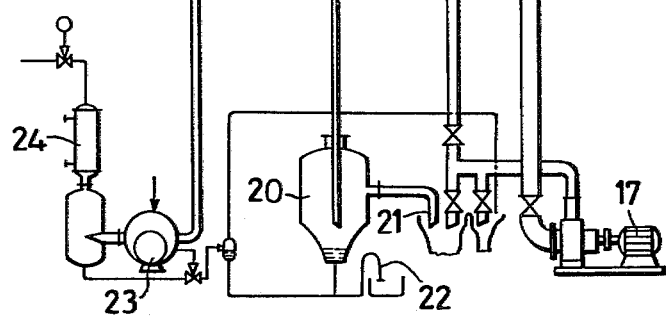

REMOVAL OF MERCURY FROM SLUDGE BY HEATING AND CONDENSING

This is a continuation of application Ser. No. 683,093 filed May 4, 1976 now abandoned.

This invention relates to a method for the purification of mercury-containing sludges, consisting in subjecting the sludges to heating in a vacuo.

Many chemical and electrochemical processes, in which mercury or mercury compounds are used, involve pollution problems since the effluents from these processes (waters and exhaust gases) contain mercury in such an amount as not to allow discharge without serious hazards.

A number of different methods have been suggested for removing metallic mercury from the discharged sludges, such as those coming from the cells for the electrolysis, from processes which use mercury compounds as the catalysts and so on.

The sludges can, for example, be filtered in rotary filters under a negative pressure (for the preliminary removal of water) to undergo subsequently heating and drying in multiple ovens, collecting mercury which is evaporated (distilled) in condenser systems (Chemical Engineering Progress, March 1974, pages 73-80 ), or it is possible to resort to a treatment with resins which act as chelating compounds and can be regenerated thus permitting that the separated mercury is recovered. (Chemical Economy and Engineering Review, 5. 1972 pages 64-65 ).

No one of the above mentioned processes, however, succeeds in removing mercury up to satisfactory levels (it has not been ever possible to go, in an appreciable manner, below 0.1 p.p. million).

We have now surprisingly ascertained that it is possible further to lower the mercury level or substantially attain the complete removal thereof.

It is thus an object of the present invention to provide a simple and cheap method for the removal mercury from sludges containing it, consisting in heating the sludges themselves in a vacuo so as to vaporize mercury which, then, under similar conditions, is condensed anew and collected.

The residual sludges and condensates can thus be discharged without experiencing more hazards of pollution, inasmuch as the removal of mercury can be pushed so far as to obtain, in such residues, values in the order of $10^{-8}\%$.

More particularly, the method of the invention is based on a preliminary heating of the dumped sludges at a temperature in the range from 200° C to 350° C, as carried out under a negative pressure ranging from 0.06 to 0.1 effective atmospheres. Subsequently the thusly obtained vapor is condensed, still under the same conditions of negative pressure, at lower temperatures, ranging from 20° C to 50° C; further traces of vapor are condensed under a pressure of 2-3 effective atmospheres and at temperatures comprised between 5 and 35° C prior to discharging the inert gases into the atmosphere: both the solid and the gaseous phase contain mercury in an order of magnitude of $10^{-8}\%$.

In order that the method of the invention may be better understood reference will be had, in the progress of the specification, to a particular continuous system which is adapted to carry the method into practice.

It is obvious, however, that this is a mere illustrative example and that anyone skilled in the art is capable of putting the method into practice by using other machinery and without thereby departing from the scope of this invention.

With reference to FIGS. 1 and 2 as shown in the drawing, the method can be regarded as being carried out in two stages, which correspond to two discrete sections, that is, an oven for the continuous roasting of the sludges and a condensation system under subatmospherical pressures of the barometric type.

The oven described herein is of the continuous type, which is indirectly heated by means of electric resistors. It is composed by a horizontal cylindrical body 1, which is heated from the outside by a set of resistors 2, independent from each other, so as to have several heat degrees, according to the load of the oven and the concentration of water and mercury.

At one end of the cylindrical body, there is formed the horizontal sludge inlet mouth 3, on the other, there have been formed a "dome" 4, for drawing vapors and, in the underlying portion, a mouth 5, the diameter of which is equal to that of the oven, for dumping the exhausted ashes. The sludge loading mechanism as shown in the cross-sectional view A-A is of the pressing screw 6 type (the pitch of the screw grows shorter and shorter) with an extrusion head equipped with cutting blades; the system is driven by an electric motor with reduction gear having a speed variator 7.

Such an expedient is responsible, during processing, of the perfectly tight seal against the losses of vacuum in the system. The automatic variation of the rpm of the loading screw is a function of the temperature of the vapors (t) in the terminal section of the oven concerned. The product charged into the oven must be a sludge having at the most 45% – 50% moisture and which has been neutralized (if and when acidic) at a pH which is certainly alkaline (8 to 9). In the interior of the cyclindrical body a shaft 8 is rotated, which equipped with a screw 9 for the feeding of mateial, which is equipped with special scraping blades 10, the latter providing to stir the sludges as they are being roasted while ensuring, moreover, that no danger of jamming is possible for the screw.

The rotation of the screw is furnished by a speed reducing gear 11, arranged at either end of the cylindrical body of the oven, the electric motor of which, 12, (two-speed) is of the kind which transfers the torque by magnetic expanders so as to guarantee the vacuum tightness in an absolute manner.

The reducing unit 11, of necessity, will be arranged in a vacuum chamber 13 and separated from the oven body by a gland seal. The run of the oven is very simple and wholly automated.

The sludges, as they come from the loading extruder, are fed forward by the screw so that, after having been first dehydrated, start to become roasted, the result being the distillation of the mercury contents.

The working conditions are 0.06 effective atmospheres at about 250° C, these conditions being such as to ensure the vaporization of all the mercury as contained in the sludges concerned. These conditions as specified above are automatically maintained by the feeding rate of flow of the sludges and by the following run parameters:

(a) speed of rotation of the feeding screw (2 speeds),
(b) insertions of the several sets of electric resistors.

There is thus the possibility of ensuring that the mercury contents in the ashes emerging from the screw is virtually zero.

Inasmuch as in the terminal portion of the oven it is imperative to ensure that all the vapors evolved from the sludges are conveyed towards the condensation system while it is concurrently required that the exhausted ashes be continually removed from a system which is under a negative pressure, the following expedient has been envisaged:

The ashes emerging from the screw fall into a duct 14, which is also heated by electric resistors, which feeds them to a container 15, the latter being placed at a barometric level, a so-called "dissolver" in which a certain level of water 16 is present.

The temperature of such water is maintained, by an automatic system, constantly at a value (about 37° C) which is slightly above the temperature corresponding to the vapor pressure of water under the same conditions of normal run of 0.06 effective atmospheres ($t° = 35.8°$ C). This expedient acts in such a way that, when the hot ashes fall in water, a certain amount of steam (a direct function of the ash temperature and their specific heat) which, superheated by the hot walls of the duct to 250° C, acts in counterflow relative to the ashes and prevents a condensation of mercury and thus the presence of the metal in the exhausted ashes.

In order, then, to encourage the dissolution of the ashes in water, there is a pump 17 which provides a vigorous recirculation through the dissolver.

Lastly, with conventional level-checking systems, thermostatically controlled water is provided and fed in, as the dissolved ashes are being withdrawn. The vapors emerging from the dome 4 of the oven at the temperature of 250° C contain, almost entirely, superheated steam coming, predominantly, from the moisture contained in the fed in sludges plus the counterflow washing steam of the exhausted ashes plus, obviously, mercury vapors.

All these steam and vapors are conveyed to a vertical tube bundle condenser 18, which is water-cooled (processing in the tubes on account of the possibility of dusts being entrained).

The condensate is collected in the bottom section of an accumulator 19, having a hydraulic seal, which is placed at a barometric level and the outlet of which directly communicate, at the zero level, with an atmospherical collecting vessel 20.

Such a condensate is composed by water and mercury: water overflows through an overflow outlet 21, whereas the mercury is automatically dumped by a siphon 22 from the bottom of the vessel.

The vapor phase of the accumulator 19 is composed by steam plus traces of mercury vapors plus the unavoidable noncondensed fractions; these latter are composed almost exclusively by air, coming from the air dissolved in ash dissolving water and that occluded in the neutralized loaded sludges.

These vapors are drawn by a liquid ring vacuum pump 23 which is intended to keep the system at a pressure of 0.06 effective atmospheres.

Obviously, the percentage of mercury vapors at the intake side of the pump is a direct function of the temperature of the cooling water in the exchanger 18, and thus to ensure the value of 0.1 milligrams per normal cubic meter of Hg in the atmospherical effluent, the delivery of the pump is sent to a second water-condenser 24, wherein at the pressure of 1 to 3 atmospheres, as controlled by a pressure adjuster, an additional condensation is effected.

As an alternative, if the specifications of the vacuum pump do not permit a very high pressure drop, the coolant for the condenser 24 can also be water cooled at least as low as 4° -6° C, coming from a refrigeration system which will have very reduced dimensions on account of the small amounts of vapor involved.

Summing up, irrespective of whichever of the two above mentioned systems is adopted, the quantity of the atmospherical effluent is at any rate in the order of a few tens of liters an hour with a contents of Hg which is always less than 0.1 milligrams per normal cubic meter.

What I claim is:

1. A method for the removal of mercury from sludge containing mercury, comprising the steps of:
    (a) heating the sludge at a temperature of from 200° C to 340° C and at a pressure of from 0.06 to 0.1 atmospheres to vaporize the mercury, the sludge having a pH of from 8 to 9 and containing less than 45 to 50% water;
    (b) condensing mercury vapor from step (a) at a temperature of from 20° C to 50° C and at a pressure of from 0.06 to 0.1 atmospheres; and
    (c) then condensing at a temperature comprised between 5° C and 30° C and at a pressure of from 2 to 3 atmospheres the mercury vapor from step (a) not condensed in step (b).

2. The method of claim 1 which comprises an additional step of rendering the sludge alkaline prior to the heating of step (a).

3. The method of claim 1 wherein the method is continuous.

4. A method for the removal of mercury from sludge containing mercury, comprising the steps of:
    (a) treating the sludge to have a pH of from 8 to 9 and to contain less than 45 to 50% water;
    (b) heating the sludge from step (a) at a temperature of from 200° C to 350° C and at a pressure of from 0.06 to 0.1 atmospheres to vaporize the mercury;
    (c) condensing mercury vapor from step (b) at a temperature of from 20° C to 50° C and at a pressure of from 0.06 to 0.1 atmospheres; and
    (d) then condensing at a temperature between 5° C and 30° C and at a pressure of between 2 and 3 atmospheres the mercury vapor from step (b) not condensed in step (c).

5. A method for the removal of mercury from sludge containing mercury, comprising the steps of:
    (a) heating the sludge at a temperature of from 200° C to 350° C and at a pressure of from 0.06 to 0.1 atmospheres to produce residual sludge in the form of ash and vapor containing mercury and water, the sludge heated having a pH of from 8 to 9 and containing less than 45 to 50% water;
    (b) condensing vapor from step (a) at a temperature of from 20° C to 50° C and at a pressure of 0.06 to 0.1 atmospheres to obtain a condensate comprised of water and mercury;
    (c) separating the condensate from step (b) into water and mercury; and
    (d) then condensing at a temperature comprised between 5° C and 30° C and at a pressure of from 2 to 3 atmospheres the mercury vapor from step (a) not condensed in step (b).

6. The method of claim 5 wherein step (d) is carried out at a temperature of from 4° C to 6° C.

7. The method of claim 5 wherein the residual sludge from step (a) is dissolved in water.

8. A method for the removal of mercury from sludge containing mercury, comprising the steps of:
  (a) treating the sludge to have a pH of from 8 to 9 and to contain less than 45 to 50% water;
  (b) heating the sludge from step (a) at a temperature of from 200° C to 350° C and at a pressure of from 0.06 to 0.1 atmospheres to produce residual sludge in the form of ash and vapor containing mercury and water;
  (c) condensing mercury vapor from step (b) at a temperature of from 20° C to 50° C and at a pressure of 0.06 to 0.1 atmospheres to obtain a condensate comprised of water and mercury;
  (d) separating the condensate from step (c) into water and mercury; and
  (e) then condensing at a temperature comprised between 5° C and 35° C and at a pressure of from 2 to 3 atmospheres the mercury vapor from step (b) not condensed in step (c).

9. The method of claim 8 wherein the residual sludge from step (a) is dissolved in water.

10. A continuous method for the removal of mercury from sludge containing mercury, comprising the steps of:
  (a) treating the sludge to have a pH of from 8 to 9 and to contain less than 45 to 50% water;
  (b) heating the sludge from step (a) at a temperature of from 200° C to 350° C and at a pressure of from 0.06 to 0.1 atmospheres to vaporize the mercury;
  (c) condensing mercury vapor from step (b) at a temperature of from 20° C to 50° C and at a pressure of from 0.06 to 0.1 atmospheres; and
  (d) then condensing at a temperature between 5° C and 30° C and at a pressure of between 2 and 3 atmospheres the mercury vapor from step (b) not condensed in step (c).

11. A continuous method for the removal of mercury from sludge containing mercury, comprising the steps of:
  (a) treating the sludge to have a pH of from 8 to 9 and to contain less than 45 to 50% water;
  (b) heating the sludge from step (a) at a temperature of from 200° C to 350° C and at a pressure of from 0.06 to 0.1 atmospheres to produce residual sludge in the form of ash and vapor containing mercury and water;
  (c) condensing mercury vapor from step (b) at a temperature of from 20° C to 50 C and at a pressure of 0.06 to 0.1 atmospheres to obtain a condensate comprised of water and mercury;
  (d) separating the condensate from step (c) into water and mercury; and
  (e) then condensing at a temperature comprised between 5° C and 350° C and at a pressure of from 2 to 3 atmospheres the mercury vapor from step (b) not condensed in step (c).

* * * * *

UNITED STATES PATENT OFFICE
CERTIFICATE OF CORRECTION

Patent No. 4,087,276    Dated May 2, 1978

Inventor(s) Gianni Generini

It is certified that error appears in the above-identified patent and that said Letters Patent are hereby corrected as shown below:

Column 4, line 16, "340°C" should read --350°C--;

line 24, "30°C" should read --35°C--;

line 43, "30°C" should read --35°C--;

line 61, "30°C" should read --35°C--.

Column 6, line 8, "30°C" should read --35°C--;

line 28, "350°C" should read --35°C--.

Signed and Sealed this

Sixth Day of March 1979

[SEAL]

Attest:

RUTH C. MASON
Attesting Officer

DONALD W. BANNER
Commissioner of Patents and Trademarks